United States Patent
Kuznetsov

(10) Patent No.: US 6,772,413 B2
(45) Date of Patent: Aug. 3, 2004

(54) METHOD AND APPARATUS OF DATA EXCHANGE USING RUNTIME CODE GENERATOR AND TRANSLATOR

(75) Inventor: Eugene Kuznetsov, Cambridge, MA (US)

(73) Assignee: DataPower Technology, Inc., Cambridge, MA (US)

( * ) Notice: Subject to any disclaimer, the term of this patent is extended or adjusted under 35 U.S.C. 154(b) by 328 days.

(21) Appl. No.: 09/733,834

(22) Filed: Dec. 8, 2000

(65) Prior Publication Data

US 2001/0056504 A1 Dec. 27, 2001

Related U.S. Application Data

(60) Provisional application No. 60/171,280, filed on Dec. 21, 1999, provisional application No. 60/171,281, filed on Dec. 21, 1999, provisional application No. 60/171,282, filed on Dec. 21, 1999, and provisional application No. 60/171,283, filed on Dec. 21, 1999.

(51) Int. Cl.[7] .............................................. G06F 9/45
(52) U.S. Cl. ................. 717/136; 717/138; 717/139; 717/153; 717/140; 715/523; 715/524; 709/231; 709/246
(58) Field of Search ............................. 717/136–140, 717/146, 153, 143; 709/213, 203, 201, 223, 231, 246; 707/103 Y, 101, 200, 10; 715/523, 524

(56) References Cited

U.S. PATENT DOCUMENTS

| | | | |
|---|---|---|---|
| 4,754,428 A | 6/1988 | Schultz et al. | 364/900 |
| 5,142,622 A | 8/1992 | Owens | 395/200 |
| 5,239,662 A | 8/1993 | Danielson et al. | 395/800 |
| 5,283,887 A | 2/1994 | Zachery | 395/500 |
| 5,315,710 A | 5/1994 | Kishimoto et al. | 395/700 |
| 5,428,771 A | 6/1995 | Daniels et al. | 395/575 |
| 5,509,121 A | 4/1996 | Nakata et al. | 395/200.1 |
| 5,530,842 A | 6/1996 | Abraham et al. | 395/500 |
| 5,535,373 A | 7/1996 | Olnowich | 395/500 |
| 5,546,584 A | 8/1996 | Lundin et al. | 395/700 |
| 5,557,776 A | 9/1996 | Brown et al. | 395/500 |
| 5,557,780 A | 9/1996 | Edwards et al. | 395/500 |
| 5,630,101 A | 5/1997 | Sieffert | 395/500 |
| 5,638,517 A | 6/1997 | Bartek et al. | 395/200.18 |

(List continued on next page.)

OTHER PUBLICATIONS

TITLE: Module Selection and Data Format Conversion for Cost–Optimal DSP Synthesis, author ito et al, ACM, 1994.*
TITLE: Interconnecting heterogeneous computer system, author: Notkin et al, ACM, 1988.*

(List continued on next page.)

*Primary Examiner*—Chameli Chaudhuri Das
(74) *Attorney, Agent, or Firm*—David D. Lowry; Brian L. Michaelis; David D. Gammell

(57) ABSTRACT

A high level transformation method and apparatus for converting data formats in the context of network applications, among other places. A flexible transformation mechanism is provided that facilitates generation of translation machine code on the fly. A translator is dynamically generated by a translator compiler engine. The translator compiler engine implemented according to the present invention uses a pair of formal machine-readable format descriptions (FMRFDs) and a corresponding data map (DMAP) to generate executable machine code native to the translator platform CPU. When fed an input stream, the translator generates an output stream by executing the native object code generated on the fly by the translator compiler engine. In addition, the translator may be configured to perform a bi-directional translation between the two streams as well as translation between two distinct protocol sequences.

17 Claims, 11 Drawing Sheets

U.S. PATENT DOCUMENTS

| | | | |
|---|---|---|---|
| 5,680,552 A | 10/1997 | Netravali et al. | 395/200.2 |
| 5,694,580 A | 12/1997 | Narita et al. | 395/500 |
| 5,706,434 A | 1/1998 | Kremen et al. | 395/200.09 |
| 5,708,778 A | 1/1998 | Monot | 395/200.1 |
| 5,708,828 A * | 1/1998 | Coleman | 715/523 |
| 5,729,755 A | 3/1998 | Turski | 395/800 |
| 5,740,374 A | 4/1998 | Raffali-Schreinemachers | 395/200.68 |
| 5,758,194 A | 5/1998 | Kuzma | 395/886 |
| 5,778,189 A | 7/1998 | Kimura et al. | 395/200.66 |
| 5,787,255 A | 7/1998 | Parlan et al. | 395/200.63 |
| 5,793,958 A | 8/1998 | Clement et al. | 395/200.5 |
| 5,812,766 A | 9/1998 | Osawa | 395/200.6 |
| 5,825,774 A | 10/1998 | Ready et al. | 370/401 |
| 5,826,017 A | 10/1998 | Holzmann | 395/200.6 |
| 5,826,219 A * | 10/1998 | Kutsumi | 704/4 |
| 5,835,789 A | 11/1998 | Ueda et al. | 395/853 |
| 5,841,985 A | 11/1998 | Jie et al. | 395/200.57 |
| 5,852,660 A | 12/1998 | Lindquist et al. | 379/230 |
| 5,916,305 A | 6/1999 | Sikdar et al. | 709/236 |
| 5,918,063 A | 6/1999 | Miyama et al. | 395/800.25 |
| 5,940,075 A | 8/1999 | Mutschler, III et al. | 345/335 |
| 5,943,481 A | 8/1999 | Wakeland | 395/200.6 |
| 5,951,645 A | 9/1999 | Goto | 709/230 |
| 5,961,594 A | 10/1999 | Bouvier et al. | 709/223 |
| 5,966,545 A | 10/1999 | Hanif et al. | 395/831 |
| 5,987,256 A * | 11/1999 | Wu et al. | 717/146 |
| 5,991,539 A | 11/1999 | Williams | 395/708 |
| 6,006,267 A | 12/1999 | Nguyen et al. | 709/227 |
| 6,009,471 A | 12/1999 | Harumoto et al. | 709/231 |
| 6,014,712 A | 1/2000 | Islam et al. | 709/246 |
| 6,021,275 A * | 2/2000 | Horwat | 717/159 |
| 6,032,147 A * | 2/2000 | Williams et al. | 707/101 |
| 6,034,963 A | 3/2000 | Minami et al. | 370/401 |
| 6,038,565 A * | 3/2000 | Nock | 707/101 |
| 6,125,391 A * | 9/2000 | Meltzer et al. | 709/223 |
| 6,195,662 B1 * | 2/2001 | Ellis et al. | 707/103 R |
| 6,195,664 B1 * | 2/2001 | Tolfa | 707/200 |
| 6,226,675 B1 * | 5/2001 | Meltzer et al. | 709/223 |
| 6,295,541 B1 * | 9/2001 | Bodnar et al. | 707/203 |
| 6,336,124 B1 * | 1/2002 | Alam et al. | 715/523 |
| 6,377,952 B1 * | 4/2002 | Inohara et al. | 707/101 |
| 6,411,395 B1 * | 6/2002 | Bahrs et al. | 358/1.15 |
| 6,463,445 B1 * | 10/2002 | Suzuki et al. | 707/200 |
| 6,488,209 B1 * | 12/2002 | Hunt et al. | 235/462.15 |
| 6,502,236 B1 * | 12/2002 | Allen et al. | 717/136 |
| 6,507,857 B1 * | 1/2003 | Yalcinalp | 715/513 |
| 6,532,473 B2 * | 3/2003 | Niazi et al. | 707/103 X |
| 6,601,056 B1 * | 7/2003 | Kagle et al. | 707/1 |
| 6,654,950 B1 * | 11/2003 | Barnishan | 717/136 |
| 6,671,701 B1 * | 12/2003 | Chouinard | 707/201 |
| 6,687,873 B1 * | 2/2004 | Ballantyne et al. | 715/500 |

OTHER PUBLICATIONS

Microsoft press Computer dictionary, Third edition, 1997.*

XP002166825, "Multi–Media Data Access," Research Disclosure, Kenneth Mason Publications, Hampshire, GB, No. 426, Oct. 1999.

XP–0012143830, Free Software Foundation, GNU Project Manual Page, Nov. 18, 1997.

XP000417250, "Parallel Compiler Generation,", Tamas Gaal, Dec. 1, 1993.

XP–002166824, "Why and How Not to Use Plain HTML," http://www.colos.ec–lyon.tr/colosLyon/papers/wwwb.htm, D. Muller, Jun. 5, 1996.

XP–002166826, "Netscape—Page Info," Apr. 27, 2001.

International Preliminary Examination Report, Oct. 10, 2001, pp. 1–4.

* cited by examiner

US 6,772,413 B2

METHOD AND APPARATUS OF DATA EXCHANGE USING RUNTIME CODE GENERATOR AND TRANSLATOR

This application claims the benefit of provisional applications 60/171,280, 60/171,281, 60/171,181, 60/171,283, all filed on Dec. 21, 1999.

FIELD OF INVENTION

The present invention relates to data transfer, and more particularly to an automated system to effect data interchange.

BACKGROUND

Networks and networked applications have grown dramatically in number, size and complexity over the past decade. While the Internet is the most prominent example, internal LAN's (Intranets) and distributed computing are also part of this growth. By definition, all networked applications need to send and receive information over a network, often communicating with other applications. The great variety of formats in existence makes integration of applications and data sources a difficult and expensive problem. Current data encoding standards are constantly replaced by newer technologies, further complicating the problem of providing connectivity between network nodes. From bit-encodings of low-level network transport protocols to HTML and XML, the problem of data and protocol translation is a complex and difficult one, because of the need to provide both high flexibility and high performance.

One of the more recent data encoding formats enjoying wide adoption, especially on the Internet, has been XML, a part of the SGML family of document description languages.

The proliferation of interconnected sites or domains known as the World Wide Web ("Web") was initially developed largely using the document description language known as HyperText Markup Language (HTML). HTML was used predominantly to specify the structure of Web documents or "pages" using logical terms. HTML, however, has inherent limitations for Web document design, primarily resulting from the limited, predefined tags available in HTML to define elements in a document or page. Nonetheless, HTML-defined documents continue to exist in significant quantities on the Web.

EXtensible Markup Language (XML) was developed as a document format protocol or language for the Web that is more flexible than HTML. XML allows tags used to define elements of a page or document to be flexibly defined by the developer of the page. Thus Web pages can be designed to effectively function like database records with selectively defined tags representing data items for specific applications (e.g. product code, department, price in the context of a purchase order or invoice document or page).

In the world of Web content, the use of XML is growing as it becomes the preferred data format in both business-to-business (B2B) and business-to-consumer (B2C) Web commerce sectors (e-business). The tremendous and continuing growth of XML in B2B applications has led to a great number of different XML e-business vocabularies and schemas. There are standardization efforts driven by industry associations, consortia, governments, academia and even the United Nations. Merely storing or transmitting e-business data "in XML" is not a guarantee of interoperability between e-business commercial entities or sites. Even the method of specifying a particular structure for an XML document has not been agreed upon, with several incompatible methods in wide use. It is therefore necessary to perform conversions between different XML formats to achieve server-to-server transfer of invoices, purchase orders and other business data in the e-business context. The problem of interoperability is exacerbated by the commingling of XML and HTML e-business sites on the Web.

Successful B2B and B2C sites are being called upon to support a greater variety of clients and client protocols. That is, sites must be accessible by different browsers running on clients, e.g. Netscape or Internet Explorer, and by different versions of these (and other) browsers. Additionally, the nature of clients and client protocols is changing and adding to the problem of interoperability. Different clients, in the form of Personal Digital Assistants (PDAs) and WAP (Wireless Application Protocol) enabled cellular phones, process XML content but need to convert it to different versions of HTML and WAP to ensure a broad and seamless reach across all kinds of web clients, from phones to powerful Unix workstations. As the diversity of web-connected devices grows, so grows the need to provide dynamic conversion, such as XML-to-HTML and XML-to-WAP, for e-business applications.

The World Wide Web Consortium has defined eXtensible Stylesheet Language (XSL) as a standard method for addressing both XML-HTML and XML-XML conversions. There are several freely available and commercial XSL processor implementations for java and C/C++ e-business applications. However, standards-compliance, stability and performance vary widely across implementations. Additionally, even the fastest current implementations are much slower than necessary to meet the throughput requirements for either B2C or B2B applications. The great flexibility provided by XML encoding generally means that such conversions are complex and time-consuming.

The XSL World Wide Web Consortium Recommendation which addresses the need to transform data from one XML format into another or from an XML format into an HTML or other "output" format, as currently specified includes three major components in an XSL processor: an XSL transformation engine (XSLT), a node selection and query module (Xpath), and a formatting and end-user presentation layer specification (Formatting Objects). XML-to-XML data translation is primarily concerned with the first two modules, while the Formatting Objects are most important for XML-to-HTML or XML-to-PDF document rendering. A typical XSL implementation comprises a parser for the transform, a parser for the source data, and an output stream generator—three distinct processes. Known XSL transformation engines (XSLT) typically rely on recursive processing of trees of nodes, where every XML element, attribute or text segment is represented as a node. Because of this, implementations suggested in the prior art simply optimize the transformation algorithms and will necessarily result in limitations on performance.

An XSL stylesheet is itself an XML file that contains a number of template-based processing instructions. The XSLT processor parses the stylesheet file and applies any templates that match the input data. It operates by conditionally selecting nodes in an input tree, transforming them in a number of ways, copying them to an output tree and/or creating new nodes in the output tree. Known XSLT implementations suffer from terrible performance limitations. While suitable for java applets or small-scale projects, they are not yet fit to become part of the infrastructure. Benchmarks of the most popular XSLT processors show that throughput of 10–150 kilobytes/second is typical. This is 10 times slower than an average diskette drive and roughly equivalent to a 128 Kbit/s ISDN line. Many websites today have sustained bandwidths at or above T1 speeds (1500 Kbit/s) and the largest ones require 100 Mbit/s or faster connections to the Internet backbone. Clearly, unless XSLT processing is to become the chief performance barrier in B2C and B2B operations, its performance has to improve by orders of magnitude.

There are a number of reasons for such poor performance. To transform one XML vocabulary to another, the processor must parse the transform, parse the source data, walk the two parse trees to apply the transform and finally output the data into a stream. Some of the better implementations allow the transform parsing as a separate step, thereby avoiding the need to repeat that step for every document or data record to be processed by the same transform. However, the transformation step is extremely expensive and consumes an overwhelming portion of processing time. Because XSLT relies on recursive processing of trees of nodes, where every XML element, attribute or text segment is represented as a node, merely optimizing the implementation of the algorithms cannot attain the necessary results. Thus current state-of-the-art XSLT implementations have to sacrifice performance in order to maintain the flexibility that is the very essence of XSLT and XML itself. So while XML and XSLT offer greater flexibility than older data interchange systems through the use of direct translation, self-describing data and dynamic transformation stylesheets, this flexibility comes with a great performance penalty.

Other known transformation or translation solutions implement "middleware" translation mechanisms. As represented in FIG. 1, in the middleware solution of the prior art, a large number of different platforms A–F, 101, 107 each may be arranged to communicate with each other. Each platform implements a format translator 103 to convert data streams between the local platform 101 and an agreed or common middleware format Z. The data stream in format Z can then be exchanged with any other node in the network. Each receiving node 107 then uses its own platform specific translator 105 to convert the data streams into a format preferred by the receiving node. Disadvantageously, such solutions require platform specific static drivers for each format. Conversion is laboriously performed by converting from the first platform format or protocol (A) to the common middleware format (Z) and then converting from the middleware format to the second platform protocol. In addition to the deficiencies in terms of time to effect such conversions, if formats change there is a need to stop or interrupt platform operations and install modified drivers in accordance with the format change(s). So while performance is often better than that of XML/XSLT solutions, flexibility is almost non-existent; performance is also considerably worse than that possible by using direct translation operating on the same formats.

Direct translation between two different formats or, more generally, two different protocols is the oldest method of achieving data interchange. By writing custom computer source code that is later compiled and installed on the target platform, it is possible to achieve interoperability between two different data formats. If the source code is carefully tuned by someone very skilled in the art, the resulting translator will be a high-performance one. However, it will not work if any change in data format or protocol occurs, and will require additional programming and installation effort to adapt to any such change. Direct translation can offer excellent performance, but it is even less flexible than the static adapters used by "middleware" systems.

Instead of a static adapter or custom-coded direct translator, it is the use of some kind of data or protocol description that can offer greater flexibility and, thereby, connectivity. U.S. Pat. No. 5,826,017 to Holzmann (the Holzmann implementation) generically describes a known apparatus and method for communicating data between elements of a distributed system using a general protocol. The apparatus and method employs protocol descriptions written in a device-independent protocol description language. A protocol interpretation means or protocol description language interpreter executes a protocol to interpret the protocol description. Each entity in a network must include a protocol apparatus that enables communication via a general protocol for any protocol for which there is a protocol description. The general protocol includes a first general protocol message which includes a protocol description for a specific protocol. The protocol apparatus at a respective entity or node in a network which receives the first protocol message employs a protocol description language interpreter to interpret the included protocol description and thereby execute the specific protocol.

Again, disadvantageously, the Holzmann implementation requires a protocol apparatus at each networked entity to interpret the protocol description. That is, the implementation is "node-centric" in that each node requires and depends on a respective translation function to a predetermined and fixed target format. Clearly, if one has the ability to equip every node in the network with a protocol interpreter such as the one described, one could conceivably equip every node in the network with a much simpler standard protocol stack to enable communication. On vast global networks, such as the Internet, it is practically impossible to change all network nodes over to a new protocol or data format—and this in turn drives the need for data interchange methods and devices.

Additionally, the implementation involves interpretation of protocol descriptions, which is a very resource-consuming process. The trade-off of Holzmann is quite similar to that made by XML/XSLT: by using self-describing data packets and a generalized interpreter, the implementation sacrifices a great deal of performance to achieve better flexibility and interoperability. Also Holzmann does not address the needs of next-generation Layer 6 and Layer 7 protocols (such as those based on XML-encoded data) for protocol translation, dealing instead with lower-level (Layer 3) protocols only.

The existing solutions to the general problem of data exchange between disparate systems and enabling connectivity between networked applications, provide either performance or flexibility, but never both.

Further disadvantages of the existing solutions include the fact that their performance is limited by the requirements of static interpretation between limited sets of static constructs. The higher the performance of the typical interpreter, the less flexibility its designers permit in the specifications of the formats. Also, even where the prior art has made provisions for adapting a format specification to changes, only one side of a specification can be changed while the other remains fixed. However, this generates a further disadvantage since it creates a "node-centric" system requiring all nodes to be changed in order to accommodate each new format specification. In addition, the typical data translators that operate as interpreters are relegated to the more stable protocols in the lower layers of the OSI model, thus severely limiting their usefulness in a rapidly changing environment.

SUMMARY OF THE INVENTION

The present invention provides a high level transformation method and apparatus for converting data formats in the context of e-business applications, among other places. A flexible transformation mechanism is provided that facilitates generation of translation code on the fly.

According to the invention, a data translator is dynamically generated by a translator compiler engine. The translator compiler engine receives a data map (DMAP) and a pair of formal machine-readable format descriptions (FMRFDs). The first FMRFD is a formal description for data coming from a source node and the second FMRFD is a formal description of data for a destination node. All three data structures (i.e. the two dynamically selected FMRFDs and the DMAP) are used to generate executable machine code (i.e. object code), for running on the CPU of the host platform, to effect the translation from the source format to the destination format. When fed an input data stream, the data translator generates an output data stream by executing the native object code (which was previously generated on-the-fly by the translator compiler engine). In addition, the data translator may be configured to perform a bidirectional translation between the two streams.

In further accord with the invention, formal machine-readable format descriptions (FMRFDs) can be defined for each data format and/or network protocol. An FMRFD describes the structural layout of the packets or data streams or other data structures being translated. An FMRFD may also include descriptions of a protocol, being a sequence of data structures being exchanged. These FMRFDs may be manually or semi-automatically loaded into the system by operators familiar with each node, or may be developed, discovered or modified automatically during communication exchanges. For example, a table of FMRFDs can be configured for each node, and a new translator created on the fly for each new FMRFD-pair encountered. Alternatively, a translator can be built for specified packet types exchanged between nodes, and applied as the corresponding packet type is encountered. As another alternative, a translator can be supplied or generated according to the source and destination node identifiers, along with identified protocols, formats, and schemas. The translator is then re-used for further transactions between the identified communicants. Furthermore, a set of predefined or standardized schemas may be accessed according to transaction types.

In another illustrative embodiment, where the protocol is XML (eXtensible Markup Language), and the conversion map is described by an XSL (eXtensible Stylesheet Language) file, an XML stream translator can be completely replaced or augmented by an optimized translator operated according to the present invention. Machine instructions, in object code, are directly executed and produce the desired output. This illustrative embodiment comprises an optimized contiguous memory algorithm, the performance of which approaches that of a memory-to-memory copy utility at speeds orders of magnitude faster than an XSLT. However, unlike a hardwired optimization, which trades flexibility for performance, the present invention preserves the flexibility through the dynamic use of the FMRFDs derived from the XSL and their corresponding data map (DMAP).

Features of the invention include provision of a data translation mechanism that is not node-centric and avoids the need for a translation apparatus or mechanism at each networked entity. The method and apparatus facilitates the efficient exchange of data between network nodes of different protocols by dynamically adapting to protocol and format changes. The present invention provides a unique solution to the growing problem of integrating disparate or incompatible computer systems, file formats, network protocols or other machine data. It allows many more formats and protocols to be accommodated transparent to the users. The mechanism is flexible in that any protocol or format that can be formally described can be used. Older systems can be retrofitted according to the invention to take advantage of next generation protocols. High performance is obtained from dynamic code generation. The need to create, install, and maintain individual, customized translators is obviated thus providing flexibility and high performance in the same data exchange apparatus.

BRIEF DESCRIPTION OF THE DRAWINGS

These and other features of the present invention will be better understood in view of the following detailed description taken in conjunction with the drawings, in which.

DETAILED DESCRIPTION

Figure 1:
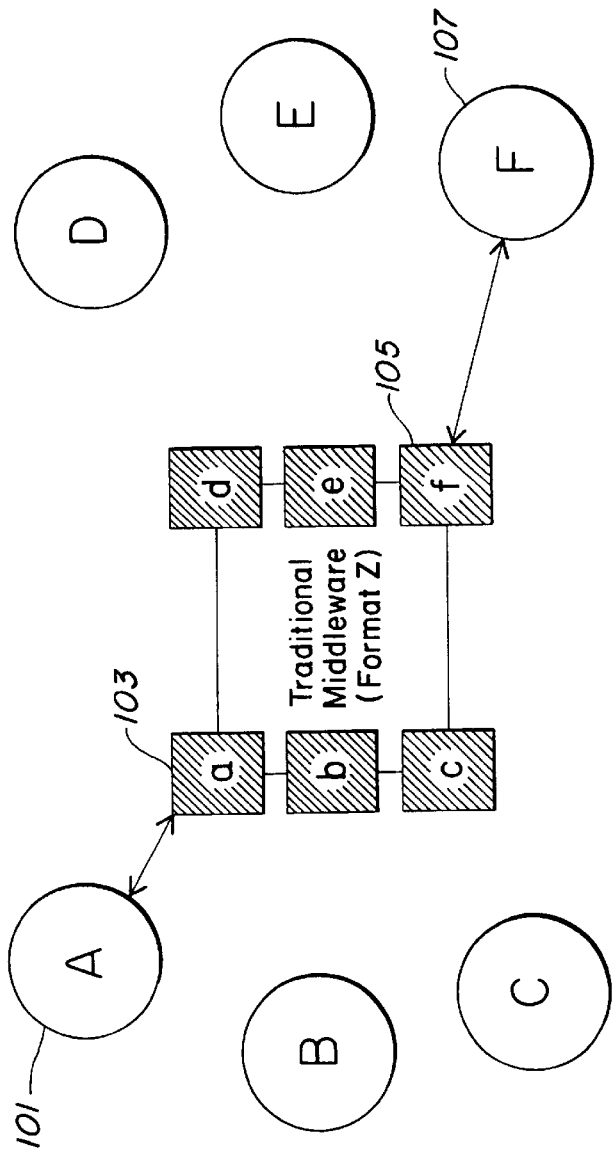
FIG. 1 is a block diagram of a software architecture according to the prior art.

Each node in a data communication network has a preferred data format in which it transmits and expects to receive data. As illustrated in the prior art FIG. 1, because the rapid development of data formats and protocols often results in multiple variations and implementations, two nodes A and F in a network may have differing format implementations (a) and (f), respectively. The present invention generally provides a system whereby information exchange between pairs of communicants is facilitated through run-time creation of or modifications to a data format translator, according to information known about their respective data formats.

At runtime, a data map is obtained for translation from a source format specification to a destination format, and the map is used, together with the protocol descriptions, to configure a translator compiler engine. The translator compiler engine then generates a specialized translator in machine code form. This translator consists of dynamically generated object code that, when executed, effects the translation of a data stream from format a to format f. Data streams are thus converted directly from one format to another without first converting to an intermediate format. Any change in format descriptions or desired mappings can be immediately accommodated by regenerating the specific data translator and using the new version for future translations.

Figure 2:
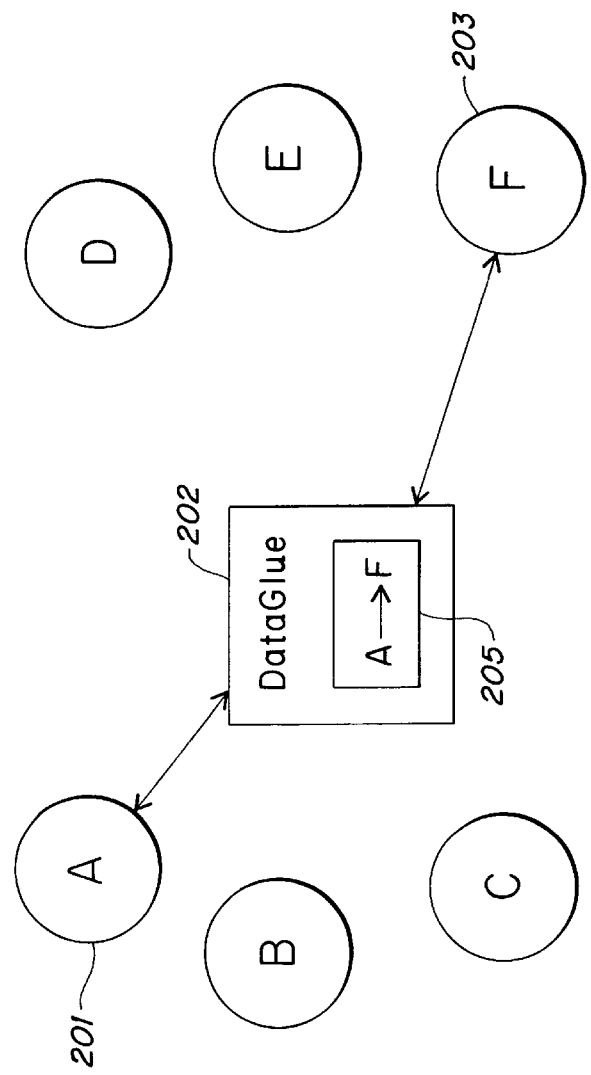
FIG. 2 is a high-level software architecture according to the present invention.

As shown in FIG. 2, data between two communicants 201, 203 can be translated directly from one format to the other (and vice versa) without the need for an intermediate format translation. A translator 205 implemented according to the present invention converts the data streams directly from the format (a) of one node A 201 to the format (f) of the other node F 203. A system implemented according to the present invention generally includes a translation processor 202 that includes a dynamically created translator 205 for translating between each pair of formats. Numerous translators can be concurrently implemented between two nodes, as where different formats are used in different protocol layers, or for different transactions, or at different times.

Figure 3:
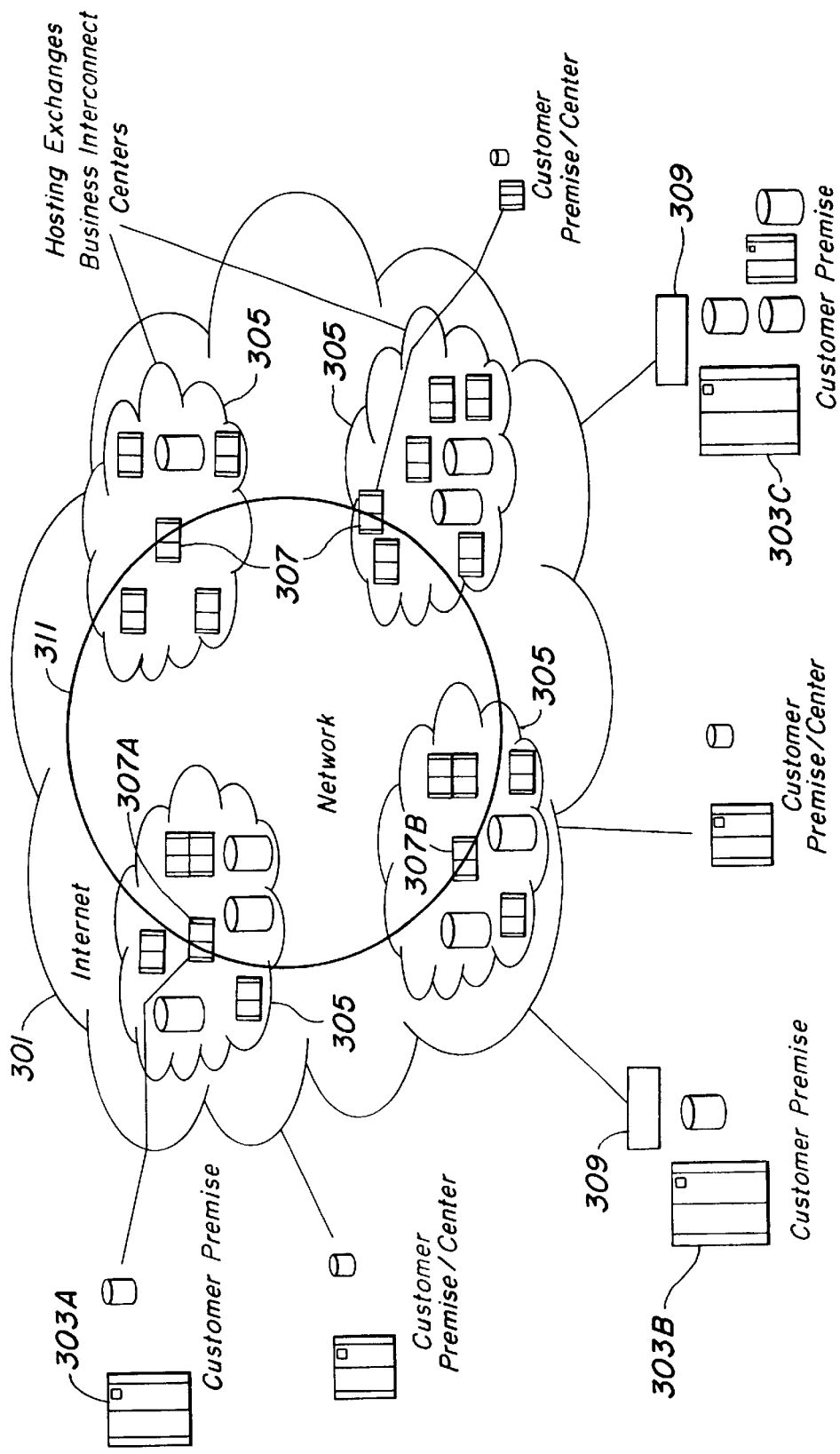
FIG. 3 is a block diagram of a network environment in which the present invention is implemented.

FIG. 3 presents a network diagram in which components which embody the present invention are configured in a number of illustrative variations applicable to a communication network environment. Computer systems at customer premises 303A, 303B are connected to the Internet 301 using standard communication protocols and using implementations of recognizable data formats. Communications between customer premises may transit various information services hosted at Hosting Exchanges or Business Interconnect Centers 305. To facilitate the transformation of data formats between centers, processors 307 configured according to the present invention may be implemented at selected centers. For other customer premises there may be a need to have localized processors 309 configured to generate the translators and make the data transformations in accord with the present invention. The latter configuration permits direct interconnection of such sites 303B, 303C, via the Internet 301, without necessarily traversing any of the interconnect centers 305.

There are several possible scenarios for translating between the two formats used by different nodes. For example, a first node F can be equipped with a translator, designed according to the present invention, and that translates the data as it arrives from any typical source (i.e., a second node A), according to the format of the received data. This provides the advantage that the translation operations at the receiving node F can be optimized according to the types of messages received from the world. A further advantage of this configuration is that none of the other nodes must be reconfigured or reprogrammed, since they each communicate with F using their own preferred formats, oblivious to the fact that F contains a translator.

Secondly, a transmitting node A can be equipped with a translator that first translates a message into the destination format of F, thus relieving F from having to recognize and translate a foreign format. Thirdly, both nodes A and F can be equipped with translators and negotiate an optimal format for exchange between them. Nodes A and F can also negotiate which one will perform any translation necessary to achieve the agreed optimal format. Again, only one node or the other is burdened with making the translation. Fourth, neither node A nor F is equipped with a translator, however the network is equipped with a translator configured according to the present invention. Transmitter A sends its message in format (a) to the translator node, the translator recognizes the packet as encoded in the format of A and retrieves the necessary transforms from format (a), used by A, into format (f), used by destination node F. The interconnector makes the necessary translation and forwards the packet to F. This not only frees up both A and F from the translation, but also permits the translator functions to be shared among other nodes.

Figure 4:
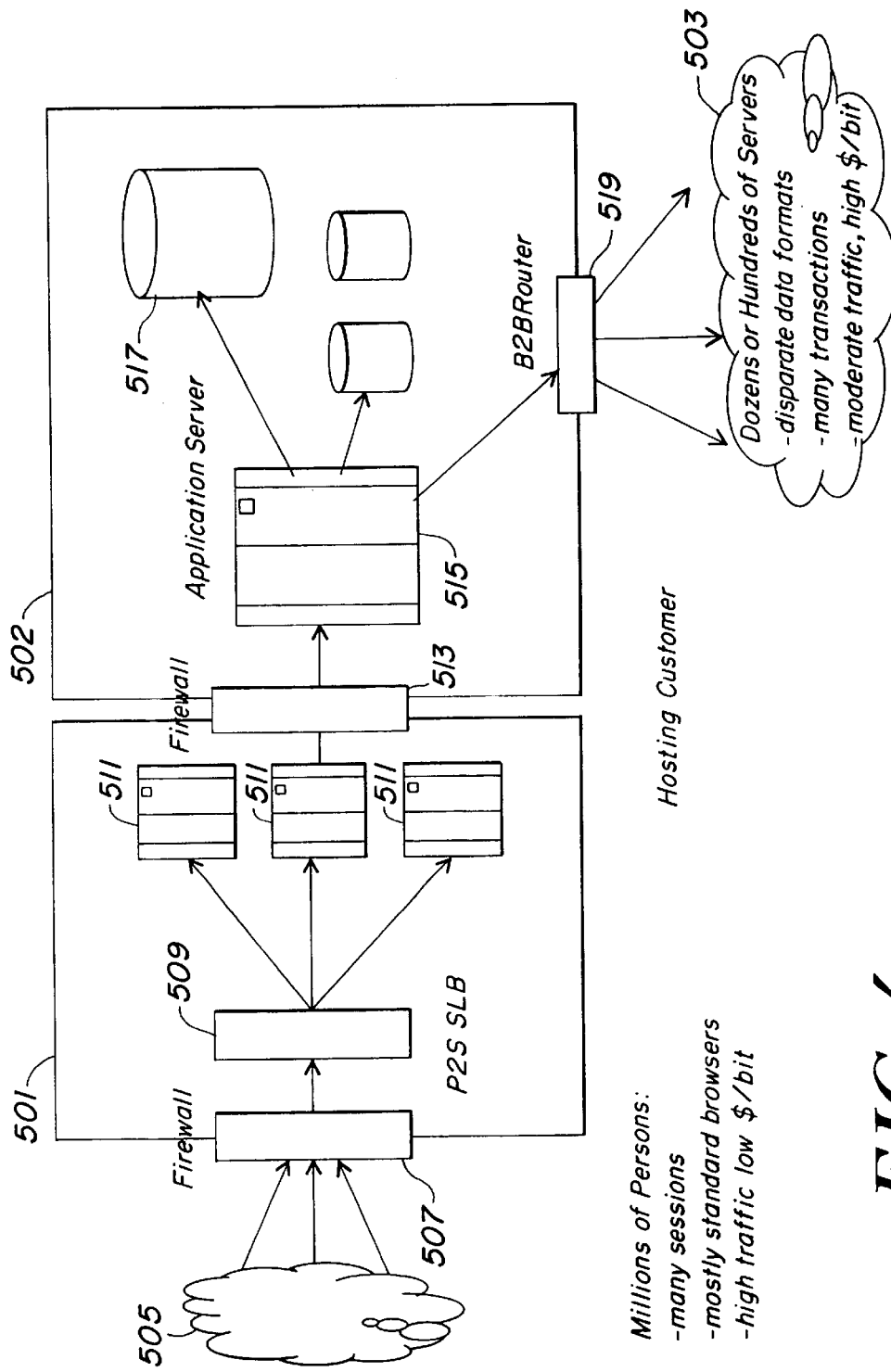
FIG. 4 is a more detailed block diagram of a representative network site in which the present invention is implemented as a B2B router.

FIG. 4 shows an environment in which implementation of the present invention may provide particular advantages: the business-to-business (B2B) environment. Users generate a high number of low-value transactions via the Internet. Validated customers can access a business through the firewall 507 connected to the Internet 505. Transactions of various kinds (such as information exchanges or purchases) are handled by the front-end interface program 509 which uses the services of a number of back end servers 511 for selected tasks. For example, an Internet user may request a purchase, and the back-end servers determine what the present inventory levels are for the requested items, and whether the user is in the shipping database.

In another scenario, the transaction may be a credit card debit in which a back-end server periodically contacts a clearinghouse for verifications or adjustments. In any case, many web-based businesses contract with other operators to provide application services 502. Application services may include, for example, electronic data interchange (EDI) transactions for effecting automated E-commerce, document distribution and publication, or other electronic record transactions. The customer servers 511 communicate through firewall 513 to the application service sites 502, either via the Internet or through other online communication means. The application servers 515 at the application service site 502 interact with local information assets and processes 517 to determine what further B2B transactions may be necessary to fulfill the customer request.

Application server 515 then advantageously uses a network element, such as a B2B router implemented according to the present invention, to reach other application servers in the high-performance portion of the Internet 503. Because of the disparate data format implementations among different application servers, a data format translation is often required. Because of the high volume of transactions, and the relatively high value of each transaction, customized translations are economically justified, but are still costly, lengthy and risky. The length factor increases the time-to-market for new products and services, and the risks include those arising from lack of protection against future format changes and resultant possibility of connection breakdown. Furthermore, using systems implemented in the prior art, it is difficult to avoid the classic trade-off of performance versus flexibility.

It is axiomatic in the field of data communications software that one may either have a customized, high-performance interface for two rigidly defined protocols and the accompanying total lack of flexibility, or one may have a more generalized translator which has much less performance but with the run-time agility to properly handle a variety of inputs. The present invention achieves high performance objectives, while retaining the same run-time agility of a generalized translator, through the use of dynamic optimization of the software being executed for a particular transaction or frame being processed. It also simplifies integration or migration by reducing the system implementers from the constraints of labor-intensive coding. It also facilitates the creation of next-generation solutions, without the requirement of waiting for adoption of a particular set of data exchange standards, by permitting a dynamic adaptation as protocols and formats change.

Additional description can be found in U.S. Provisional Applications 60/171,280, filed Dec. 21, 1999, entitled "Capability Based Apparatus and Method for Exchange of Digital Content and Data Between a Server Computer System and a Multitude of Client Computer Systems of Varying Capabilities", which is incorporated herein in its entirety. Additional description can be found in U.S. Provisional Applications 60/171,281, filed Dec. 21, 1999, entitled "Data Oriented Programming Process for Integration of Disparate Computer Systems and Data", which is incorporated herein in its entirety. Additional description can be found in U.S. Provisional Applications 60/171,282, filed Dec. 21, 1999, entitled "System for Flexible Dynamic High Performance Data Interchange Utilizing Interpreter an/or Runtime (Dynamic) Code Generation", which is incorporated herein in its entirety. Additional description can be found in U.S. Provisional Applications 60/171,283, filed Dec. 21, 1999, entitled "Active Network System for Exchange of Structured E-Business and E-Content Data in a Multitude of Formats", which is incorporated herein in its entirety.

Although the invention is described in a data networking context for a B2B router, it should be appreciated that such a high-performance and flexible format translation mechanism can be implemented in many other contexts. The generalized system can be applied to the growing problem of integrating disparate or incompatible computer systems, file formats, network protocols, or other machine data. This applies whether the data is recorded in a storage device, preserved in temporary memory, or transmitted over a network. This approach allows many more formats and protocols to be accommodated flexibly while preserving the performance and simplification advantages.

Figure 5:
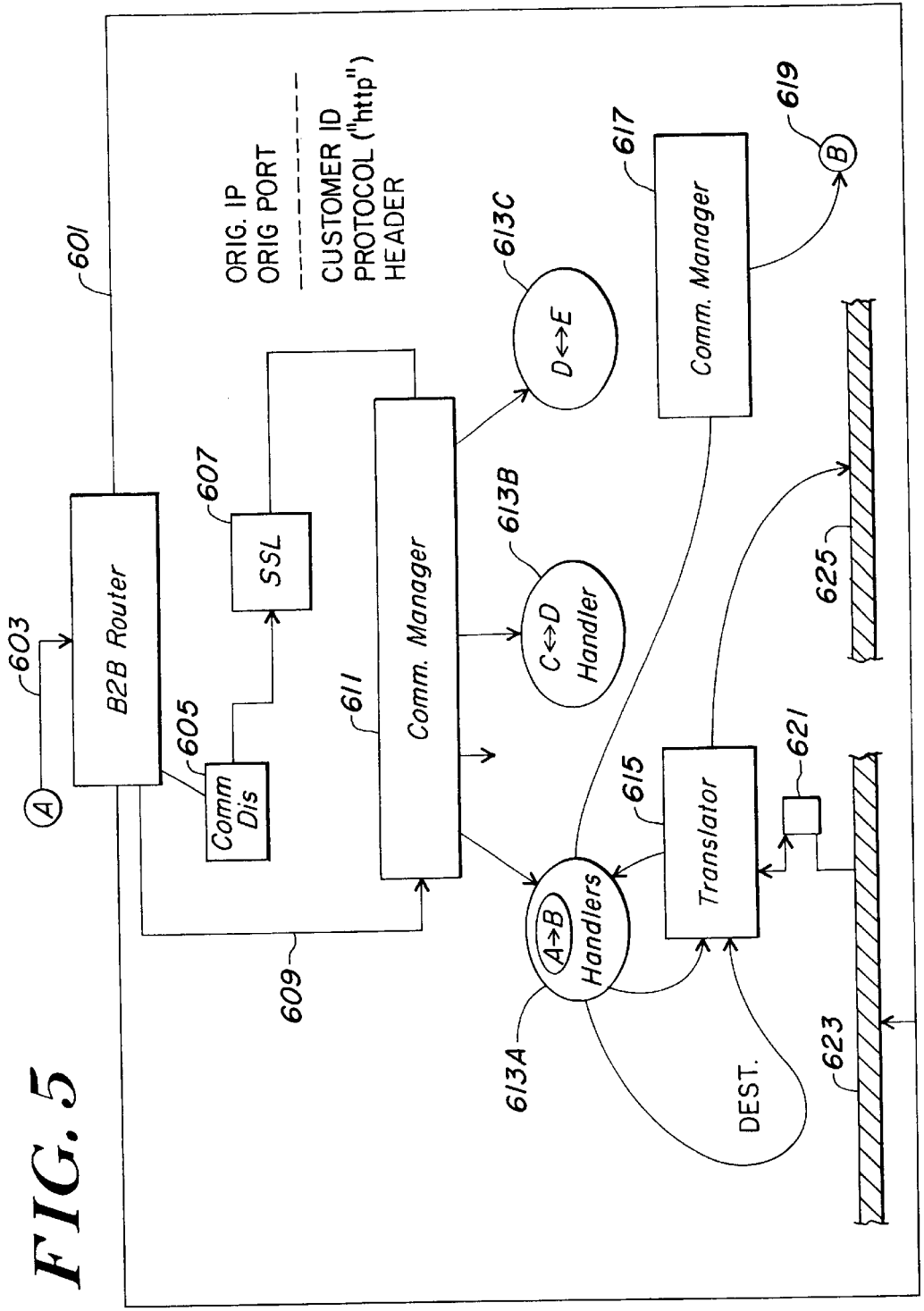
FIG. 5 is a more detailed block diagram of an illustrative embodiment of a B2B router using the present invention.

In an illustrative embodiment of the present invention, shown in FIG. 5, a business-to-business router 601 comprises the following components. The incoming data stream is received by a communication dispatcher 605 for handling communication with the other (incoming) communicating party. Where the dispatcher 605 recognizes an encoded protocol, such as encrypted or compressed, an optional decoder 607 is employed in a manner typical in the art of security (e.g., secure socket layer, "SSL") or compression or other encoding. The decoder decodes portions of the received data stream to form a decoded stream. The decoded stream can then be further processed for additional identification information by the communication manager 611. Using the identification information, a communication handler 613A is selected from a plurality of communication handlers 613 for managing the flow of information to and from a translator 615. Each translator 615 converts an input data sequence into an output data sequence, and the data handler routes the output sequence to an appropriate outgoing communication manager 617. The outgoing communication manager 617 then communicates with the destination node of the transaction 619. The destination node is typically another B2B router or another server, when implemented in the data network context.

A stream of data 603 arrives from an external source, such as an application server 515, and headers and other selected fields are separated 605, 609 and processed 607, 611 to detect source and destination identification information, along with the data format and protocol being used. At the lowest protocol levels, a unique address or other identification will suffice for identification, such as the combination of an IP address and a socket corresponding to a current communication channel. Protocol identification can be a configurable parameter, or determined by reference to standard identification fields in the messages, or may be determined empirically, such as by mapping against a known set of permitted protocols. Similarly, the format specification may be configurable, or by reference to standard identification fields in real time.

At higher protocol levels, perhaps after decryption (or multiple steps of decryption, decompression, and validation at different protocol levels), a customer ID, transaction code, or other packet-specific identification may be derived from the packet itself. Implementations of selected protocols may benefit from retention of temporary state information, such that the communication manager need not fully decode succeeding packets from the same stream, provided that the stream has already been uniquely identified for further processing. State information is stored in an optional scratch memory or finite state machine 621, and used by the translator 615 as necessary. For example, an invoice document has already been identified as between specific parties, and the next document in the same channel can be processed more quickly because the system can be configured to select and re-use identification information, or other content learned earlier.

Using the identification information, a communication handler 613A is selected from a plurality of communication handlers 613, if one exists for the identified combination of source and destination nodes (at a given protocol layer). Otherwise a new handler may be created, depending upon predefined optimization criteria. Data content obtained from the input stream is routed through the selected data handler 613A, translated (i.e., transformed) as necessary by the corresponding translator 615, and forwarded to a connection manager 617 for the destination node 619.

For example, handler 613A for A->B receives information streams from source A destined to target B, where A and B can each be defined as a particular data format/protocol/address node pair within the network. Another handler 613B for C->D receives information for another identified node pair, where C->D may handle translation of a different protocol layer in the A->B transaction, or may simply handle translations of the same protocol layer between different source and destination addresses. Where format-checking or data checking reveals an exception case (i.e., an error or unexpected data), a more general-purpose parsing and error-handling routine can be triggered, with concomitant performance penalties.

The selected data handler 613A selects the corresponding translator 615 which accepts a memory segment (e.g., a buffer) 623 as input. Translator 615 executes its native translator program and generates an output stream 625. The handler 613A then interacts with the connection manager 617 to schedule the outgoing transmission to the destination node 619.

Figure 6:
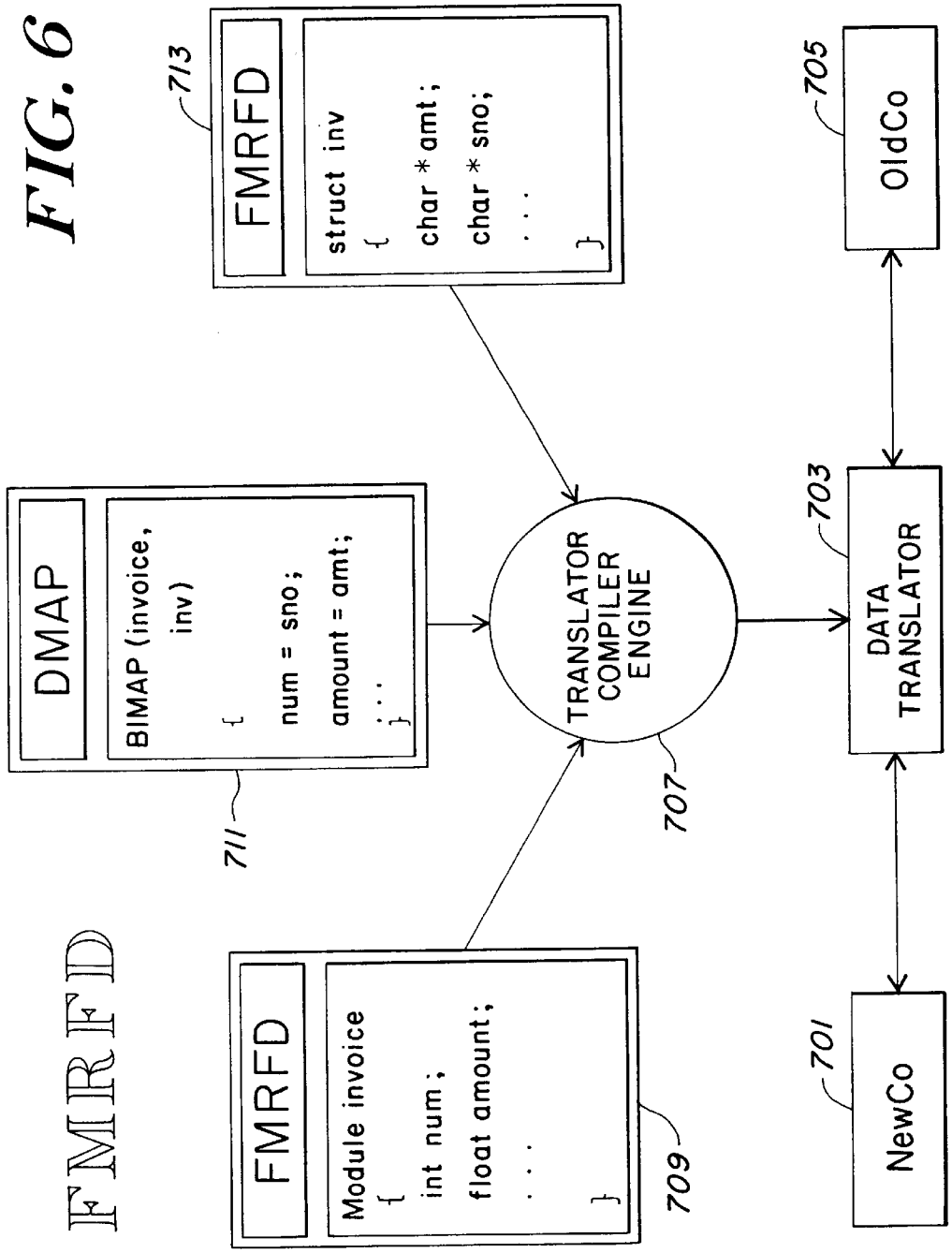
FIG. 6 is a block diagram showing an illustrative embodiment of the invention for configuring a translator compiler engine to create a translator for converting data formats between two data streams.

The translator 615 is schematically diagrammed in FIG. 6 in which a data translator 703 is dynamically generated by a translator compiler engine 707. The translator compiler engine 707, implemented according to the present invention, has three inputs: a first FMRFD 709, a DMAP 711, and a second FMRFD 713. The first FMRFD 709 is a formal description for data coming from a source node and the second FMRFD 713 is a formal description of data for a destination node. The translator compiler engine 707 receives and uses all three data structures to generate executable machine code native to the data translator 703, for running on the CPU of the host platform, to effect the translation from the source format to the destination format.

When fed an input data stream 701 the data translator 703 generates an output data stream 705 by executing the native object code (which was generated on the fly) provided by the translator compiler engine 707. In addition, data translator 703 may be configured to perform a bi-directional translation between the two streams 701, 705.

An optional finite state machine (FSM) 621 can also be implemented beneficially, as determined by the application, where states and their transitions are defined in a typical manner known to those skilled in the art, such as with sequences of packet types and their contents. For example, where a specific type of packet is generally followed by another identified type (or some determinable number of acceptable packet types), the translator engine can use an FSM to reflect the known protocol, thus reducing the number of validating tests that must be made on subsequent packets.

An FSM can also be used for handling protocol sequence differences between the standards adopted in nodes A and B. For example, assume node A uses a protocol with a "double handshake", whereas node B uses a protocol with a single message and acknowledgement. Node A will only send a second packet when it has received an "OK" from node B, and node B will only send an "OK" message when it has received a complete message sequence from node A. An FSM can be implemented to avoid a deadly embrace in which node B is waiting for the next data packet, while node A is waiting for node B to acknowledge the first packet. Under the prescribed circumstances, the FSM would trigger the necessary acknowledgement packets back toward A in order to receive and forward the next packet to B, which would then generate the actual node B acknowledgement. An FSM can be implemented separately from the data translator or directly compiled into its runtime-generated code, depending on specific requirements. Error detection mechanisms are also provided as necessary to handle missing or unexpected packets, or other transitions for which the FSM need not be optimized.

According to the invention, a formal machine-readable format description (FMRFD) can be defined for each data format preferred in each node. These FMRFDs may be manually or semi-automatically loaded into the system by operators familiar with the data formats of each node, or may be developed, discovered or modified automatically during communication exchanges by inspection of the formats of messages being exchanged between communicants.

For example, a set of FMRFDs can be configured for each node, and a new translator created on the fly for each new FMRFD-pair encountered. Alternatively, a translator can be built for specified packet types exchanged between nodes, and applied as the corresponding packet type is encountered. As another alternative, a translator can be supplied or generated according to the source and destination node identifiers, along with identified protocols, formats, and schemas. The translator is then re-used for further transactions between the identified communicants.

Because data format implementations may vary from one site to another, the format identification for an identified connection can be used as an index to select how data exchanged with the identified correspondent will be handled. Format implementations may also change from one connection to the next, and may also change according to other local factors (such as on-going testing of new formats, down-level forms in some workstations, or user errors). An FMRFD may also include descriptions of a protocol, being a sequence of data structures being exchanged between communicants.

In one illustrative embodiment, fields of a record or sections of a transmitted document can be defined as logical packet segments, and used to build an FMRFD. A description of a logical packet segment comprises one or more of the following:

A segment identifier (field name or sequence number),
Position relative to other segments,
Position relative to start of packet,
Data type (which may further refer to another packet description),
Constraints on data found in this field,
Byte and bit offset,
Reference to other segments for further information necessary to decode this segment (e.g., array length, optional field),
Primer, a start tag or sequence of segments or values indicating the start of the segment, and
End tag, and end tag or sequence of inner segments or values indicating the end of the segment.

An FMRFD may be expressed in any number of standard or proprietary formats, memory tables, computer languages or notations. Some examples include: ASN.1 (Abstract Syntax Notation One), IDL (Interface Definition Language), BNF (Backus Naur Form) variants, C/C++, java, VHDL, Verilog, lexx/yacc, SDL (Specification and Description Language), MSC (Message Specification Chart), HTML (HyperText Markup Language), XML, runtime object introspection information, or any combination of these.

In some cases, such as XML, the user data is intermixed with the format specification through use of markup or tagging. In other cases, such as ASN.1, a packet of user data may refer to the appropriate format specification. In yet other cases, such as raw data streams or buffers, the user data and the format may be entirely separate and their correspondence has to be known or established through other means. Combinations of these models are also possible, with additional opportunities for validation and error checking.

A DMAP is created when formal descriptions of two differing data formats are combined into a data segment mapping structure for each communicating node. Each logical packet segment of an FMRFD can be compared with those of a target FMRFD and a mapping arranged. Given two FMRFDs, a specific set of bytes in format X are always transformed into a specific set of bytes in format Y, according to the data segment mapping. For example, data structures identified by a set of tags in one format are mapped to different data structures with the same tags in the other format. A translator compiler engine then creates new executable object code for a run-time translator, according to the data formats and segment mappings.

DMAPs may be expressed in any one or combination of the notations used by FMRFDs, as described above. In one implementation, there is a purely binary-to-binary mapping whereby each input symbol is mapped to an output symbol.

Furthermore, a set of predefined or standardized schemas may be accessed according to transaction types. The recent emergence of web services directories composed of protocol descriptions used for e-business communication would be another possible source of protocol format description information for the invention generally and the B2B router embodiment, specifically.

Figure 7:
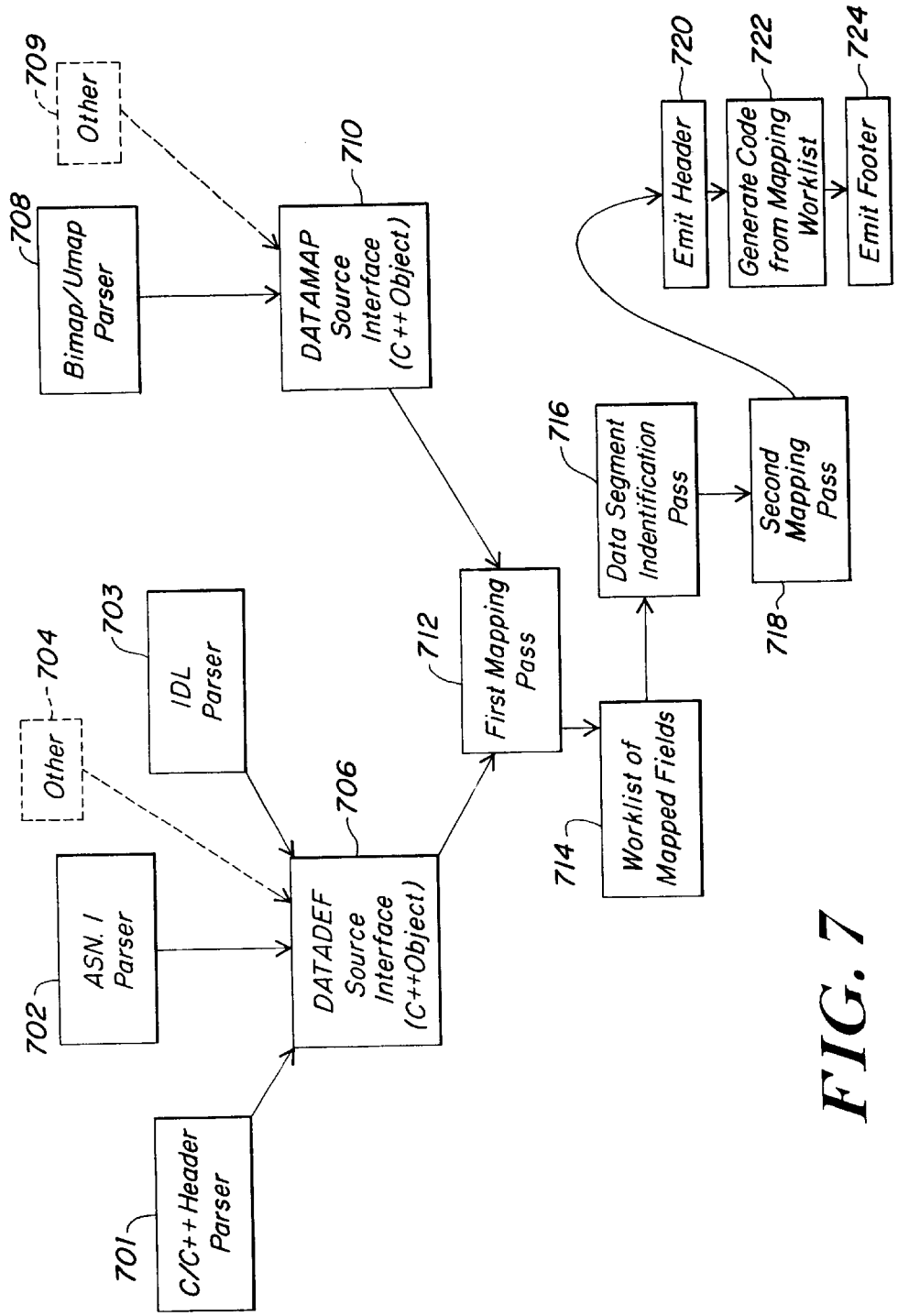
FIG. 7 is a block diagram of an implementation of a translator compiler engine according to an illustrative embodiment for binary translations.

FIG. 7 is a diagram of an illustrative embodiment of a data translator compiler for the general case of configuring a compiler for generating a translator adapted to translating binary data streams. One or more FMRFD parsers 701, 702, 703, 704 provide inputs to a DATADEF source interface 706, and one or more DMAP parsers 708, 709 provide inputs to a DATAMAP source interface 710. A first mapping pass 712 utilizes the DATADEF 706 and DATAMAP 710 to create a worklist of mapped fields 714 which is fed to a data segment identification pass 716. These interim results are then subject of a second mapping pass 718. The translator then emits a header 720, generates executable cod from the mapping worklist 722, and emits a footer 724.

The parsers can be selected as appropriate for parsing FMRFD inputs provided as C/C++ Headers 701, ASN.1 formats 702, IDL 703, or other standard or proprietary parsers 704 can be adapted to generate the required DATADEF 706 from the corresponding FMRFD formats. Similarly, DMAP parsers can be implemented as a bitmap/umap parser 708 or can be replaced or supplemented with other parsers as may be appropriate to other standard or proprietary formats of the mapping inputs provided to the translator compiler.

Once a DATADEF 706 and DATAMAP 710 have been created from the FMRFDs and the DMAP, the first mapping pass 712 is executed. During this operation, each field in the DATADEF 706 structure is validated and mapped to an intermediate structure kept in the worklist of mapped fields 714. Fields implemented as embedded structures, forward references, or pointer structures cannot always be resolved in the first mapping pass, and these instances can be accommodated using intermediate constructs as are known in the field of general software compiler design.

The worklist of mapped fields 714 is then passed to the data segment (or fragment) identification pass 716. In the operation of this pass, the individual fragments of the data packet layout are identified. This step provides the opportunity to ease and perhaps optimize the data translation operation. A data segment is an addressable consecutive memory region. Information within a segment can be identified as an offset within a particular segment. A packet (or other structure to be translated) will often include information which is stored in multiple segments. The term "fragment" refers to information which is stored in a non-contiguous memory location, and which is thus directly addressable without computation of an offset. After the data segment identification pass 716 is complete, the second mapping pass 718 is carried out. In this second mapping pass, the system resolves the remaining internal references that could not be handled during the first mapping pass 712. The result is a complete mapping worklist that can be used for generating object code.

The data translator compiler then completes its operation by emitting a function header prologue, and generating code 722 for all fields in the mapping worklist, and then emitting a function footer 724. The ultimate result is an object code load module that can be immediately executed on the target machine to perform a translation from an input data format to an output data format.

Although the illustrative embodiment is described in terms that result in the generation of executable machine code (binary), those skilled in the art will appreciate that the result of a translator compiler engine may also be output in other forms such as assembly code, byte-code, or other op-codes. These other forms of output may be destined for execution by other machines, such as interpreters. Similarly, the output of a translator compiler engine can be fed to a Field Programmable Gate Array (FPGA) for configuration of hardware gates (solid-state switches) that would implement all or part of a translator in hardware.

Any number of such translators can be implemented simultaneously, such that an entire set (or selected subset) of packets can be translated during runtime. However, the system implemented according to the present invention, with a translator compiler engine, retains the ability to create new translators as the need arises during run time processing. Thus, even a first protocol exchange between new partners may be run through an optimized translator which has already become optimized for the two nodes according to the known (or derived) information about the transaction. As further transactions or exchanges proceed, the data translator compiler engine can be manually or automatically and dynamically optimized for generating a more specialized translator for handling what become "familiar" packet types or sequences.

It should be apparent to those skilled in the art that a DMAP can also trigger the generation of additional code for carrying out runtime computations within the data stream. For example, where an output packet format requires a checksum, the translator can be adapted to perform the necessary calculations over the translated data and provide the necessary checksum. As another example, a DMAP may define the presentation of a subtotal number which would require a specified generic calculation based upon translated data. An implementation according the present invention may also incorporate predefined functions, or references to external functions that can be called at runtime, according to the needs of the translator, as generated by the translator compiler engine.

In another illustrative embodiment, where the protocol is XML (eXtensible Markup Language), and the conversion map is described as an XSL (eXtensible Stylesheet Language) file, an XML stream translator can be completely replaced or augmented by an optimized translator operated according to the present invention. As currently specified by the Worldwide Web Consortium, there are three major components in an XSL processor: XSLT, the transformation engine; Xpath, the node selection and query module; and Formatting Objects, the formatting and end-user presentation layer specification. XML-to-XML data translation is primarily concerned with the first two modules, while the Formatting Objects are the most important for XML-to-HTML or XML-to-PDF document rendering.

Figure 8A:
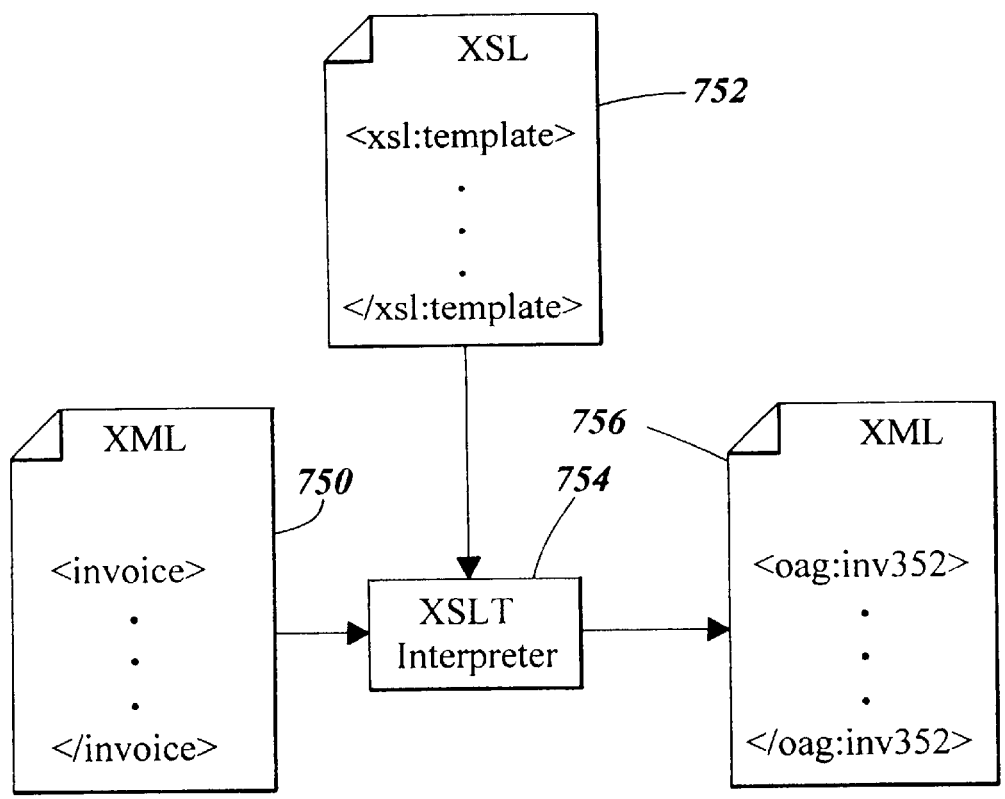
FIG. 8A is a block diagram of a prior art software environment in which an XSL translator interprets between two XML formats.

FIG. 8A illustrates a typical environment in which an XSLT interpreter 754 is implemented. An XSL stylesheet 752 is itself an XML file that contains a number of template-based processing instructions. The XSLT processor 754 parses the stylesheet file 752 and applies any templates that match the input data. It operates by conditionally selecting nodes in the input tree, transforming them in a number of ways, copying them to the output tree and/or creating new nodes in the output tree.

To transform an input XML vocabulary 750 to another (output) XML vocabulary 756, the XSLT translator processor 754 must parse the transform, parse the source data, walk the two parse trees to apply the transform, and finally output the data into a stream. Because XSLT relies on recursive processing of trees of nodes, where every XML element, attribute or text segment is represented as a node, merely optimizing the implementation of the algorithms will not result in a large performance improvement.

Figure 8B:
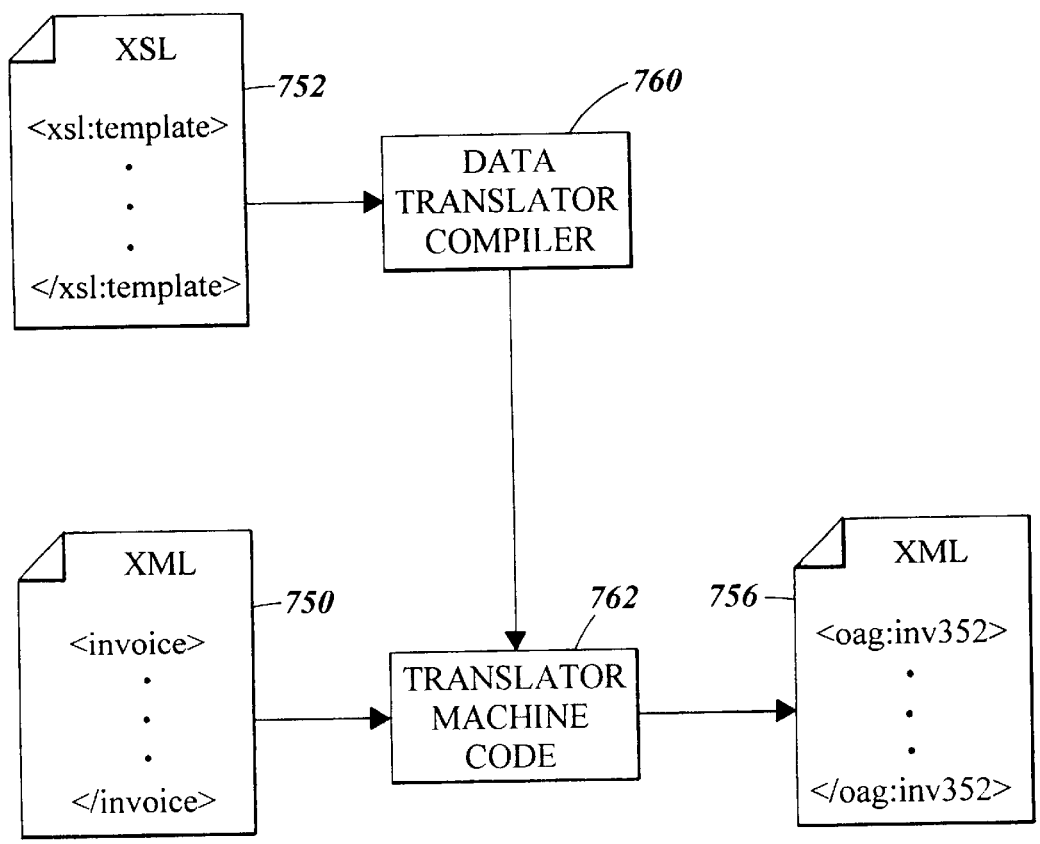
FIG. 8B is a block diagram in which a translator compiler engine and a data translator are implemented according to an illustrative embodiment of the present invention for XSL.

According to an implementation of the present invention, as shown in FIG. 8B, a data translator compiler 760 is adapted for using the XSL stylesheet 752 as its input, in lieu of a source and destination FMRFD. This is possible because the XML format is in a self-describing form. The XSL stylesheet 752 and its constituent templates also provides the necessary DMAP elements. The data translator compiler 760 then generates executable machine code 762 that operates as a run-time translator between the source XML 750 and the target XML 756.

Instead of performing a number of interpreted dispatch operations on three different trees, the CPU in the translator platform simply executes the native instructions (object code) directly and produces the desired output stream. In addition, because so much of the desired transformation is known before the object code is generated, all the generic unnecessary processing steps can be optimized away. Significant performance gains are achieved by generating native processor instructions to make it possible to use XSL in applications where high volumes of real-time data must be processed.

This illustrative embodiment comprises an optimized contiguous memory algorithm, the performance of which approaches that of a memory-to-memory copy utility at speeds that are orders of magnitude faster than a typical XSLT. However, unlike a hardwired optimization, for which the major trade-off is performance versus flexibility, the present invention preserves the flexibility through the use of the FMRFDs derived from the XSL and their corresponding Data Segment Map (DMAP).

Figure 9:
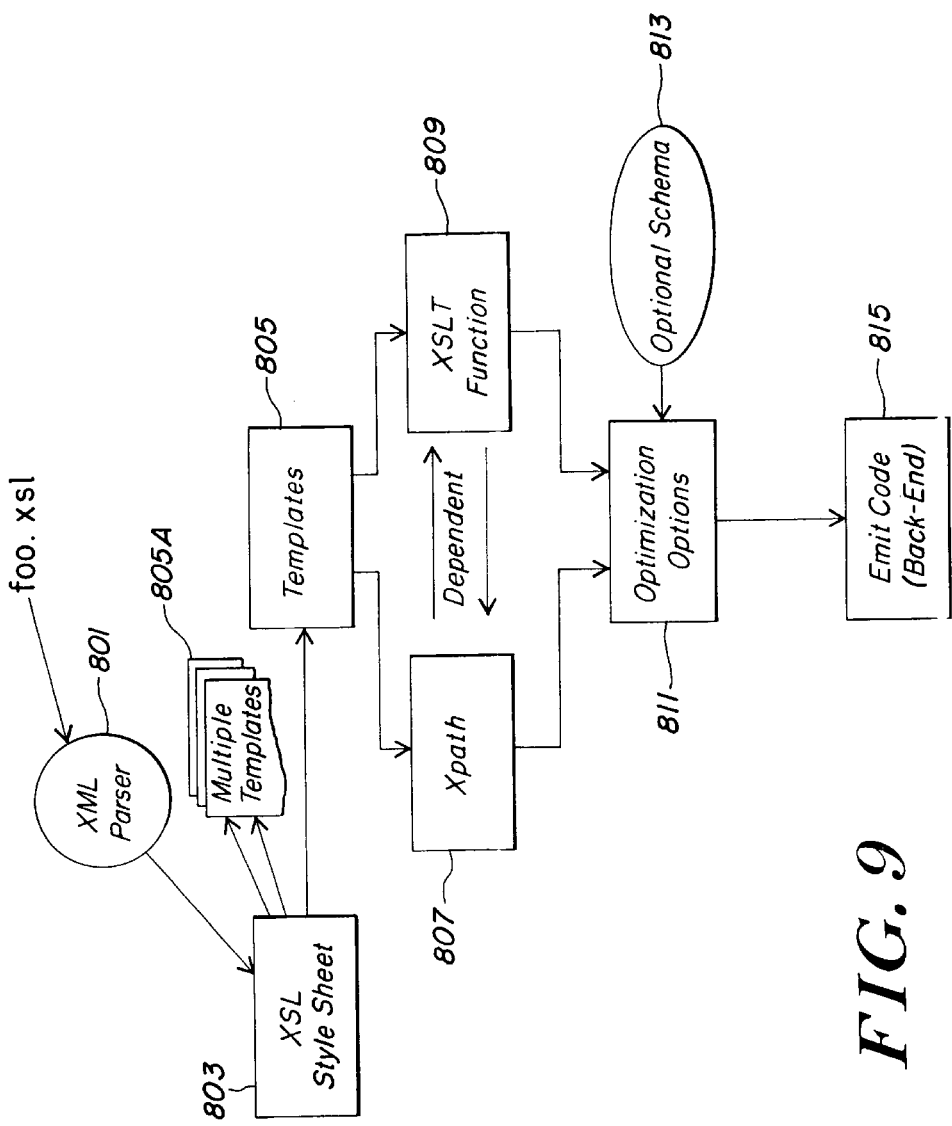
FIG. 9 is a block diagram of a data translator compiler according to an illustrative embodiment for an XSL translator compiler.

There are several overriding design principles that have guided the development of this illustrative embodiment:

1. XSL processing must remain dynamic, so any optimizations should occur at runtime; converting XSL to other programming languages (whether standard or proprietary) during development and then using the result of that conversion is not an option, because it destroys the dynamic flexibility and reconfigurability inherent in XML technologies 2. the data translator should be optimized for cases where the same XSL transform is applied to different data again and again; this is often the case in web application servers and B2B integration, but is less frequent in authoring applications or web browsers; and 3. the ultimate performance targets for both throughput and latency shall be set by the requirements of existing and future applications, not by trying to achieve an incremental improvement over current implementations FIG. 9 diagrams the operation of an implementation of an illustrative embodiment specifically designed for XML translation. An input file such as file foo.xsl is run through an XML parser 801 to generate an XSL stylesheet 803. A number of templates 805, 805A are then spawned from the XSL stylesheet 803, depending upon the occurrences of top-level elements. Each template 805 is then processed by both the Xpath functions 807 and the XSLT functions 809 to generate intermediate results comprising a parsed template. Those skilled in the art also recognize that XSLT and Xpath are dependent upon each other. The data translator compiler can then either directly emit code 815 or may optionally optimize the intermediate code 811 prior to emitting code 815. Optimization options 811 may also be informed by optional schema 813, as further described below.

Because a given XSL template being processed by the inventive system is not generic, many opportunities for optimization become available. Several of them are especially notable: schema-driven short-circuiting, custom validation, and parse-time validation.

The use of data schemas (such as DTDs, XML Schema, etc.) presents an additional opportunity for XSLT optimization. Because a schema restricts the type, order and layout of data in a particular XML format, it is possible to pre-compute a great deal of the XSL transformation. One example is "schema-driven element access shortcircuiting" technique, which is a special case of constraint-propagation. For example, a particular XSL transform uses an XPath expression such as //bar to select and transform all nodes named <bar> anywhere in the document. This would mean that every element in the document may have to be tested to see if it matches. If the schema states that <bar> may appear only as the third element, an optimizing transform processor (implemented according to the present invention) can conclude that any valid source document can only have the <bar> element in that position, and thereby avoid testing any other elements. This can potentially reduce the time to select a node for processing by a factor of N, where N is the total number of nodes in a given tree.

Unfortunately, the schema validation phase itself presents a significant performance challenge. Especially in B2B transactions, it is important to validate the data against the contracted schema, but validation can take several times longer than simply parsing XML. There are two important characteristics of this process that allow for substantial optimizations. First, if validation is being performed and a document fails validation, it can be rejected without further processing being performed. Under these circumstances a system optimized for handling a specific type of XML document need only to be able to process a valid document and gracefully reject any invalid document. Second, many schemas used in e-business data integration (as opposed to documents) are very rigid and relatively simple. For these situations, the validation process is considerably more linear and straightforward than that for the general case.

A validating XML processor can be thought of as a lexer (the XML parser which breaks the input into XML tokens and nodes) and a parser (the XML validator, which verifies that the input complies with the particular syntax dictated by the data dictionary). Traditionally, these steps are combined into a coupled single-pass parser. For example, this is the approach used by the familiar yacc & lex parser-generator tools. The XML parsing and validation passes can be combined, yielding a single custom parser that would parse and validate simultaneously. As with XSL optimizations customized according to the prior art, it is dangerous to make these decisions during development by including hand-written or even machine-generated custom XML parsers into an application. Although limiting the structure and features of XML data handled by the application will improve its performance, it will also destroy the dynamic nature of XML and limit the long-term reliability and maintainability of the application. When the application is a one-off utility tool, this is usually not a problem.

Figure 10:
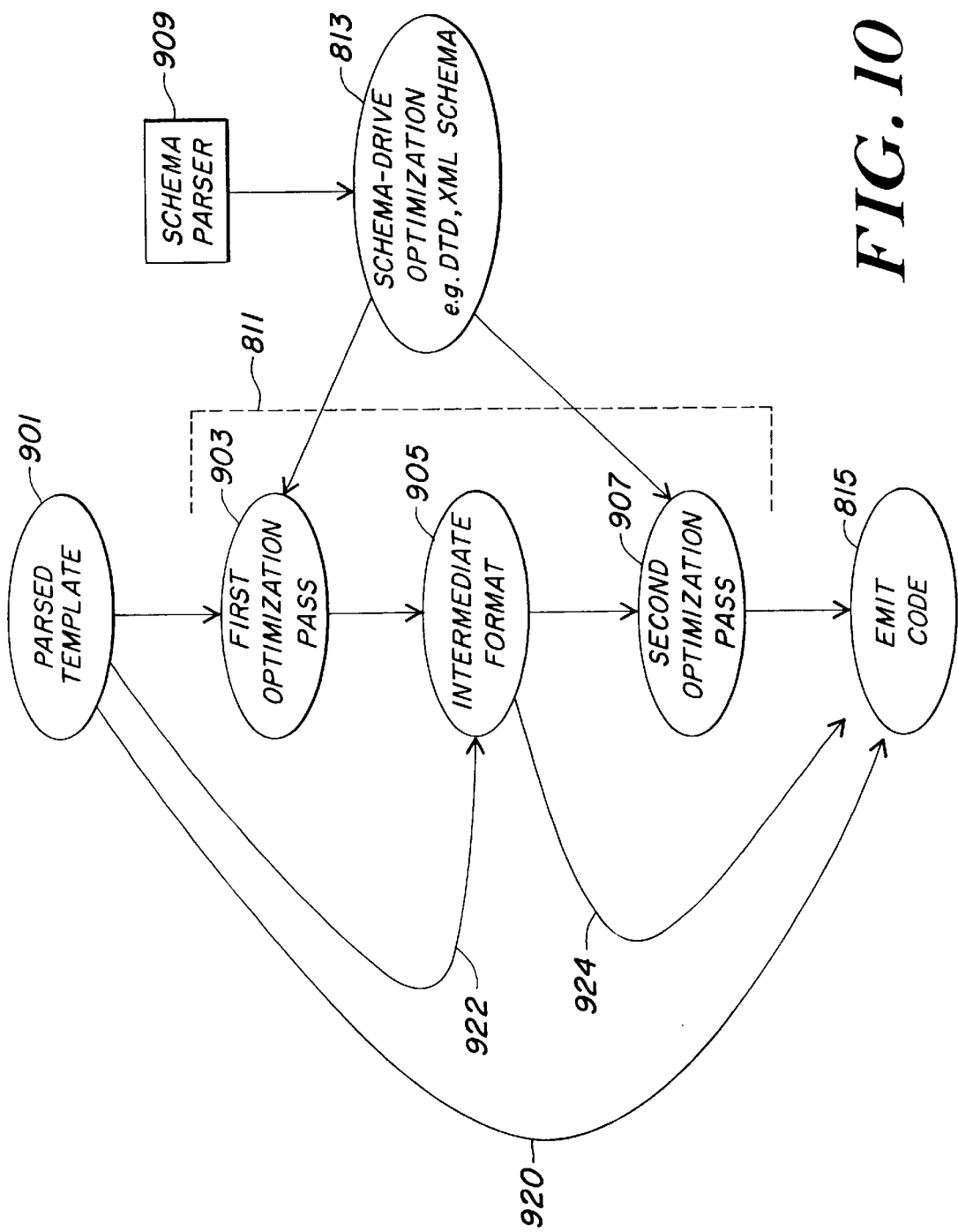
FIG. 10 is a flow chart of representative code optimization options in an embodiment using an optional schema-driven optimization.

FIG. 10 illustrates several possible permutations of optimization according to an illustrative embodiment. The optimization options 811 comprise first optimization pass 901, which generates intermediate format 905, and second optimization pass 907. Either the first optimization pass 903 or the second optimization pass 907 can optionally and independently use schema driven optimization 813.

A parsed template 901 can be used directly to emit code 815 by simply bypassing 920 all optimization. Furthermore, the parsed template 901 may be used to directly generate an intermediate format 905 by bypassing 922 the first optimization pass 903. Similarly, the intermediate format 905 can be used to directly emit code 815 by bypassing 924 second optimization pass 907. If no optimization passes are bypassed, then a parsed template 901 is subjected to a first optimization pass 903 to generate an intermediate format 905 which is further subjected to a second optimization pass 907, before emitting code 815. The necessity or opportunity for optimization depends upon a number of operational factors such as: the requirements of the particular implementation, customer preferences, availability of schema, the detailed content of the available schema, and heuristic benefits analyses.

A schema parser 909 provides the input to the optional schema-driven optimization 813 that can be used in either the first or second optimization passes 903, 907. Examples of such schema include DTD or an XML schema.

But when it comes to business-to-business connections or other important data links, both high-performance and dynamic flexibility must be preserved. Dynamic code generation and binding is able to provide for custom parsers generated at runtime, preserving all of the flexibility of XML and avoiding much of the performance overhead.

Common Subexpression Elimination, or CSE for short, is a classic code optimization method from compiler theory. It is often employed in hand-optimized as well, and is best illustrated by a short example:

$$A=3-(X*B) \to CS=X*B$$

$$C=6+(X*B)A=3-CS$$

$$C=6+CS$$

In this trivial illustration, the expensive (X*B) computation is eliminated by caching its result in a temporary variable CS, but much more complex optimizations are possible provided that the expression's operands are not modified. Although CSE is a well-known technique, its application to XSLT optimization has not been previously published. The illustrative embodiment uses CSE to avoid repeatedly computing the same selection of nodes or XPath function—instead, the result is computed once and reused throughout the compiled transformation. The studies of XSLT performance bottlenecks have shown that many templates used today repeatedly compute the same node set or XPath function value.

Specific applications of the illustrative embodiment include the following: High-speed XML-to-HTML rendering for application and web servers, XML <-> bXML (WAP) transcoding for wireless and PDA applications, Wirespeed B2B application protocol and business data interchange, and DoS (Denial-of-Service) protection and other security applications The growing number of websites shifting to XML as a publishing and content-management medium drives the need for high-speed XML-to-HTML rendering. With performance on the order of 100 Kbytes/sec., employing a traditional XSLT interpreter on a busy site could easily mean dozens of additional servers to deliver T3 speeds (of 10 Mbits/second). Caching transform output is currently the only approach for reducing the load on either the web server or on the content distribution network. However, more and more web pages are assembled on the fly from a variety of static and dynamic information. Such dynamic pages are unsuitable for prolonged caching, and optimizing dynamic transforms becomes an absolute requirement. A system implementing the illustrative embodiment of the present invention can deliver the necessary performance gains.

The growing role of wireless personal devices (Palm Pilots, cell phones, web tablets and others) means that websites must also convert their content to binary XML-based WAP (Wireless Application Protocol) content. There are great differences in processing, display and connection speeds between wireless devices, which means that custom XSL stylesheets are needed for different devices and service providers. Personalization and dynamic pages are even more prevalent in WAP applications, requiring potentially one XSLT transformation per page per wireless client—an overwhelming burden on even the best servers or WAP gateways. As the number of personal device clients with Internet connectivity grows to millions, the illustrative embodiment enables wireless service and content providers to keep pace.

As more network applications use XML as the means to communicate, there is an increased probability of Denial-of-Service attacks that exploit the very flexibility of XML that makes it popular. Broadly speaking, a typical DoS attack transmits invalid packets to the target host or router, forcing it to expend resources to service the fake requests and thereby degrade or deny service to legitimate requests. The well-known TCP SYN Flood and Unix Process Table Overflow attacks exploit the ability to initiate a connection request without completing it. Other attacks send malformed packets designed to induce the network node to consume processing or bandwidth resources.

In all cases the ability of a content-sensitive switch or server host to stand up to such an attack is based on its ability to quickly reject an invalid packet or connection request. Because parsing and especially validating XML are lengthy operations, it may take much longer to determine that a particular XML-RPC request is invalid than to do so for a binary RPC or TCP packet. Malicious XSL templates can also consume unbounded memory and CPU resources. Therefore, the ability to quickly determine that a particular XML-encoded request is invalid and reject it without any further processing or consumption of resources is absolutely essential to the survivability of a B2B-aware network node or router. The illustrative embodiment delivers fast XML switching and XSL transformation, enabling high-performance protection against a new generation of DoS attacks.

It will be appreciated by those skilled in the art that a translator compiler engine can be configured and optimized for creating native machine code on any target CPU, whether a general purpose processor or a customized processor. Similarly, the translator compiler engine itself can be run on any type of processor, and may be implemented on a platform that is separate and distinct from the data translator. In such circumstances, there would be a communication channel between the translator compiler engine and the processor running the data translator. Furthermore, multiple translator compiler engines can be run simultaneously and make their result available for execution by one or more translators. The translator compiler engine and translator processor may also be operated in a distributed network, although there may be a performance degradation introduced by having to traverse additional communication links with real-time data streams.

As mentioned above, the B2B router may be implemented as an independent unit or as a portion of an existing application server or as a portion of an existing network switch or router. In either case, different functions described herein can be carried out by different processors simultaneously or at different times without detracting from the utility of the invention.

Although the invention is shown and described with respect to several illustrative embodiments thereof, it should be appreciated that the foregoing and various other changes, omissions, and additions in the form and detail thereof could be implemented without changing the underlying invention.

What is claimed is:

1. A method of dynamically accommodating communication between disparate data formats comprising the steps of:

at run time, determining an input format description describing a layout of data fields for incoming data, and an output format description describing a layout of data fields used in communicating output data;

supplying a data segment mapping for at least some data fields from said input format description to said output format description; and generating a set of executable machine instructions for direct processing, said executable machine instructions being generated as a function of said data segment mapping, said input format description and said output format description, said executable machine instructions to translates an input data stream directly into an output data stream.

2. The method of claim 1 further comprising the step of executing said executable machine instructions for translation of said input data stream into said output data stream.

3. The method of claim 1 in which at least one of said input format description and said output format description is defined in terms of a formal machine readable format description (FMRFD).

4. The method of claim 1 in which said step of determining said input format description and said output format description further comprises the steps of:

selecting said input format description, from a pre-configured set of format descriptions, according to an identification of a format used for communication with a first node; and selecting said output format description, from a pre-configured set of format descriptions, according to an identification of a format used for communication with a second node.

5. The method of claim 4 in which at least one of said identification of a format used for communication with a first node and said identification of a format used for communication with a second node is determined by an identification criterion selected from the list of manual operator input, automatic discovery of a format, a source node with a known format, a destination node with a known format, recognition of a known protocol or schema, and recognition of a transaction type.

6. The method of claim 1 in which said steps of determining said input format description and said output format description and supplying said data segment mapping further compromise the step of interpreting an XSL stylesheet to derive at least one template, where portions of said template correspond to input format description, output format description, and a data segment mapping.

7. The method of claim 1 wherein said executable machine instructions comprise binary object code for execution by a computer processor.

8. The method of claim 1 wherein said executable machine instructions comprise byte-code executable by an interpreter.

9. The method of claim 1 wherein said executable machine instructions comprise encoded inputs for programming of a field-programmable gate array.

10. A method of dynamically facilitating translation of data between disparate data formats comprising the steps of:

processing an XSL style sheet to determine at least one template, said template including at least one of an Xpath function or an XSLT element;

generating a set of executable machine instructions for execution by a processor according to said processed template, where said executable machine instructions to directly translate an input data stream to an output data stream, receiving information encoded in an XML format; and executing at least some of said set of executable machine instructions by a processor to produce a stream of output information in a format determined by said XSL stylesheet.

11. The method of claim 10 in which said step of generating a set of executable machine instructions further comprises the steps of:

selecting an optimization plan including at least one optimization pass; and generating optimized machine code according to each of said at least one optimization pass, where the output of each optimization pass which is not a final optimization pass comprises an intermediate format which is input to a succeeding optimization pass, according the said selected optimization plan.

12. The method of claim 11 in which at least one of said optimization passes includes a schema-driven optimization.

13. The method of claim 10 wherein said executable machine instructions comprise binary object code for execution by a computer processor.

14. The method of claim 10 wherein said executable machine instructions comprise byte-code executable by an interpreter.

15. The method of claim 10 wherein said executable machine instructions comprise encoded inputs for programming of a field-programmable gate array.

16. A dynamic translator compiler engine, for run time generation of executable machine code according to an input format description, an output format description, and a data segment map, comprising:

a selector for selecting said input format description, said input format description describing a layout of data fields for incoming data, a selector for selecting an output format description; said output format description describing a layout of data fields used in communicating output data;

a data segment mapping resource adapted for mapping at least some data fields from said input format description to said output format description; and a code generator for generating a set of executable machine instructions for execution by a processor, said executable machine instructions generated as a function of said data segment mapping, said input format description and said output format description, said executable machine instructions to directly translate an input data stream to an output data stream.

17. A method of dynamically facilitating translation of data between disparate data formats comprising the steps of:

processing an XSL style sheet to determine at least one template, said template including corresponding Xpath functions; and generating a set of executable machine instructions for execution by a processor, said executable machine instructions generated as a function of said processed template, said executable machine instructions to directly translate an input data stream to an output data stream.

* * * * *

UNITED STATES PATENT AND TRADEMARK OFFICE
CERTIFICATE OF CORRECTION

PATENT NO. : 6,772,413 B2  Page 1 of 1
DATED : August 3, 2004
INVENTOR(S) : Eugene Kuznetsov It is certified that error appears in the above-identified patent and that said Letters Patent is hereby corrected as shown below:

Column 1,
Line 6, please change "60/171,181" to -- 60/171,282 --.

Column 13,
Line 7, please change "cod" to -- code --.

Column 19,
Line 11, please change "translates" to -- translate --.
Line 62, after "template," delete the word "where".

Signed and Sealed this

Fifteenth Day of November, 2005

JON W. DUDAS
*Director of the United States Patent and Trademark Office*